(12) United States Patent
Duvaut et al.

(10) Patent No.: US 7,103,097 B1
(45) Date of Patent: Sep. 5, 2006

(54) SYSTEM AND METHOD FOR REDUCING PEAK-TO-AVERAGE RATIO (PAR) VALUES

(75) Inventors: Patrick Duvaut, Eatontown, NJ (US); Laurent Pierrugues, Keansburg, NJ (US)

(73) Assignee: Conexant, Inc., Red Bank, NJ (US)

( * ) Notice: Subject to any disclaimer, the term of this patent is extended or adjusted under 35 U.S.C. 154(b) by 813 days.

(21) Appl. No.: 10/224,726

(22) Filed: Aug. 20, 2002

Related U.S. Application Data

(60) Provisional application No. 60/313,845, filed on Aug. 21, 2001.

(51) Int. Cl.
*H04B 1/38* (2006.01)

(52) U.S. Cl. ...................................... 375/222

(58) Field of Classification Search ............... 375/260, 375/285, 295–298, 222; 370/206, 208, 525–526; 455/501, 63.1
See application file for complete search history.

(56) References Cited

U.S. PATENT DOCUMENTS

| | | | |
|---|---|---|---|
| 6,314,146 B1 * | 11/2001 | Tellado et al. | 375/346 |
| 6,366,555 B1 * | 4/2002 | Gatherer et al. | 370/210 |
| 6,487,253 B1 * | 11/2002 | Jones et al. | 375/260 |
| 6,580,751 B1 * | 6/2003 | Gardner et al. | 375/222 |
| 6,657,950 B1 * | 12/2003 | Jones et al. | 370/208 |
| 6,757,299 B1 * | 6/2004 | Verma | 370/482 |
| 6,845,082 B1 * | 1/2005 | Bourget et al. | 370/210 |

OTHER PUBLICATIONS

Power Consumption and PAR in DSLs John M. Cioffi and Jose Tellado; Aug. 3-7, 1998.
The Crest Factor for Trigonometric Polynomials Part I: Approximation Theoretical Estimates K. Jetter, G. Pfander, and G. Zimmerman; 2001.
Analog Codes for Peak-to-Average Ratio Refuction Werner Henkel; Jan. 17-19, 2000.
Analysis of Tone Selection for PAR Reduction Niklas Petersson, Albin Johansson, Per Odling and Per Ola Borjesson; 2001.
Another Application for Trellis Shaping: PAR Reduction for DMT (OFDM) Werner Henkel; Sep. 2000.
PAR Reduction Revisited: An Extension to Tellado's Method Werner Henkel and Valentin Zrno; Sep. 18-19, 2001.

* cited by examiner

*Primary Examiner*—Khanh Tran
(74) *Attorney, Agent, or Firm*—Thomas, Kayden, Horstemeyer & Risley

(57) ABSTRACT

A system and method for reducing peak-to-average ratio (PAR) values in signal transmission systems is presented. The presented approach divides a plurality of symbols into a number of non-overlapping subsets of symbols, and manipulates each of the non-overlapping subsets of symbols to produce a plurality of sub-sequences. A strategic manipulation of the subsets of symbols results in the reduction of PAR values.

26 Claims, 10 Drawing Sheets

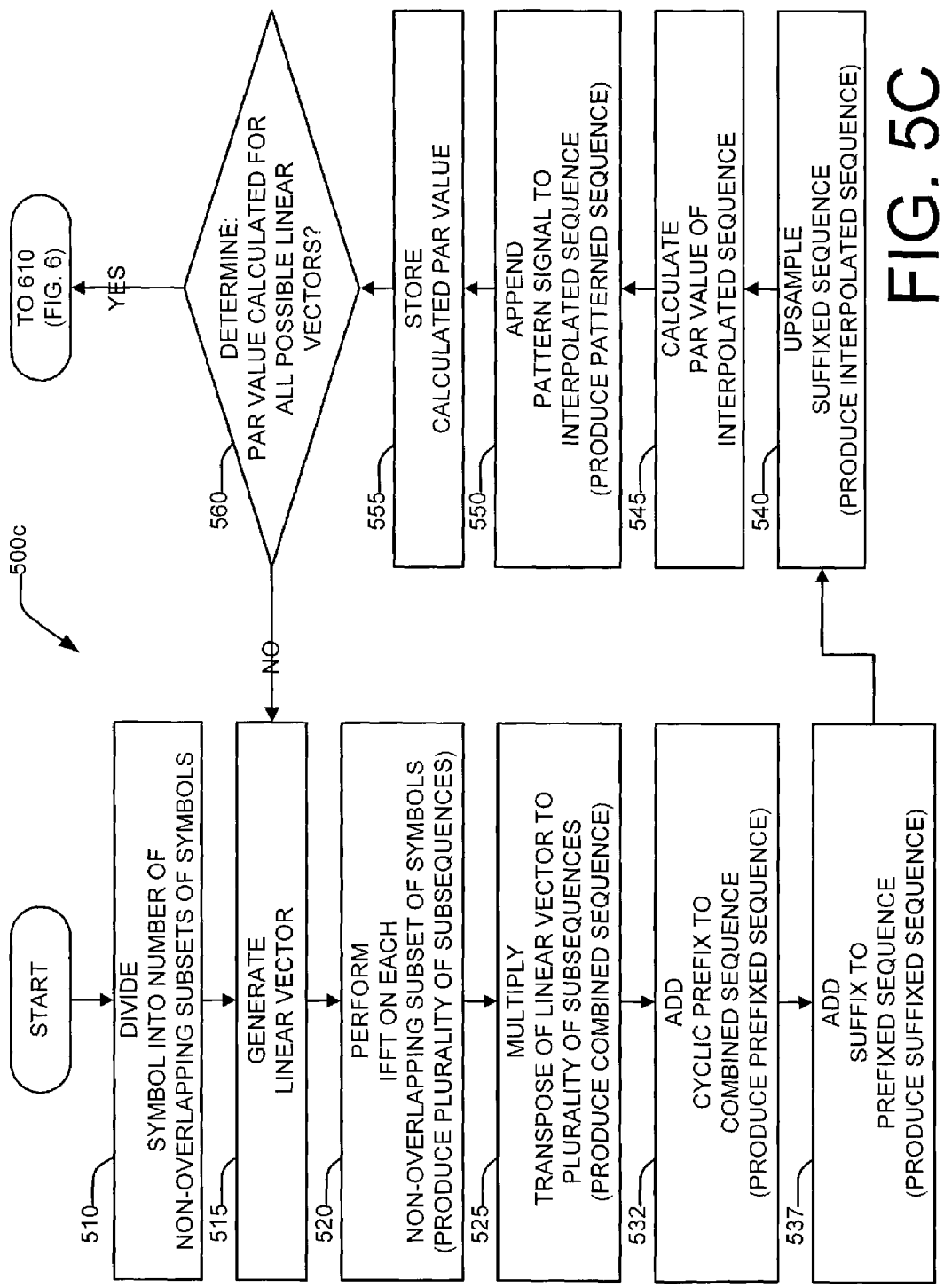

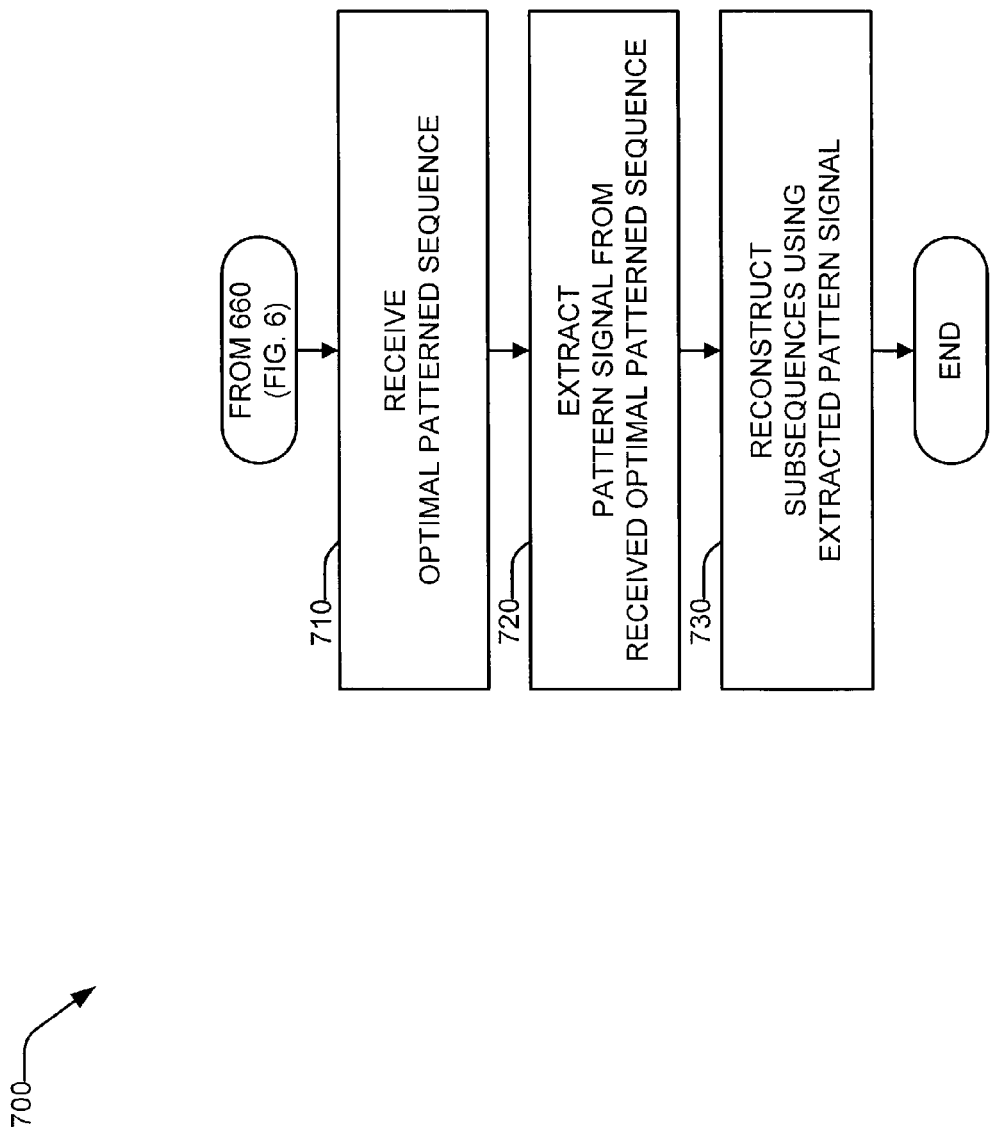

SYSTEM AND METHOD FOR REDUCING PEAK-TO-AVERAGE RATIO (PAR) VALUES

CROSS REFERENCE TO RELATED APPLICATIONS

This application claims the benefit of U.S. provisional patent application Ser. No. 60/313,845, filed Aug. 21, 2001, which is incorporated herein by reference in its entirety.

FIELD OF INVENTION

The present invention relates generally to communications systems, and, more particularly, to a system and method for reducing peak-to-average ratio (PAR) values.

BACKGROUND

In modern digital communication, a channel input signal is generally synthesized as a linear combination of certain bases functions whose coefficients bear information to be transmitted. For example, in an asymmetric digital subscriber line (ADSL) system using N sub-carriers, the basis function is represented by:

$$x(n) = \frac{1}{N}\sum_{k=0}^{N-1} X(k)\exp\left(\frac{j2\pi nk}{N}\right)$$

where X(k) is the coefficient bearing the information symbols to be transmitted. Since the inverse Fourier transform (IFT) is equivalent to a summation of several different frequencies, the resulting signal x(n) becomes approximately Gaussian for large N, according to the central-limit theorem. This means that there may be some very high peaks present in the signal x(n).

One of the problems encountered in the presence of high peaks within x(n) is a large peak-to-average ratio (PAR) value, or, equivalently, a large crest factor, which reduces the reliability of transmission systems. This is due to the fact that power amplifiers are typically only capable of modulating signals that are bounded by a fixed constant. Thus, any input signal exceeding this value is "clipped" at this level. In other words, if high peaks are present within x(n), then there is a possibility that these high peaks will be "clipped" because the high peaks exceed the bounds of the power amplifier. This introduces noise to the system, reduces the signal-to-noise ratio (SNR), and, thus, has strong impact on the reliability of the system. In order to reduce this effect, one can attenuate the amplitude of the entire signal. However, this worsens the SNR directly, and, further, reduces the system SNR due to increased quantization noise.

Given the problems associated with potentially large PAR values in digital communication systems, a need exists in the industry to reduce PAR values, thereby improving reliability of digital communication systems.

SUMMARY

The present invention provides systems and methods for reducing peak-to-average ratio (PAR) values. Briefly described, in architecture, one embodiment of the system comprises a symbol divider configured to divide a plurality of symbols into a number of non-overlapping subsets of symbols, and a processor configured to manipulate the subsets of symbols to reduce PAR values.

The present invention can also be viewed as providing methods for reducing PAR values. In this regard, one embodiment of the method comprises the steps of dividing a plurality of symbols into a number of non-overlapping subsets of symbols, and manipulating the non-overlapping subsets of symbols to reduce the PAR value.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 5C is a flowchart showing steps associated with another embodiment of the invention.

FIGS. 6 and 7 are a flowcharts showing additional steps associated one embodiment of the invention.

DETAILED DESCRIPTION OF THE PREFERRED EMBODIMENTS

Figure 1:
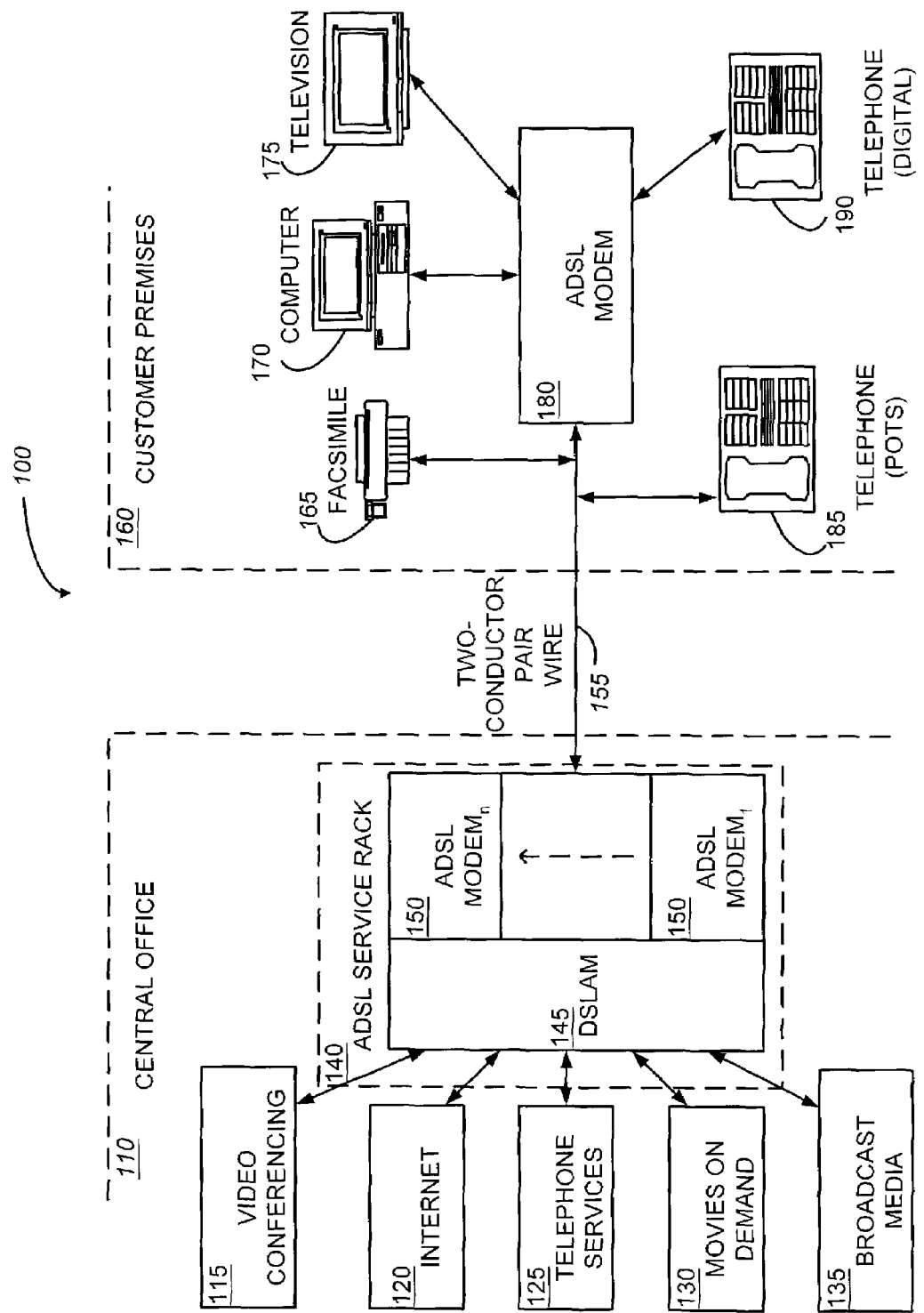
FIG. 1 is a block diagram showing a digital communication system employing asymmetric digital subscriber line (ADSL) technology.

Having summarized various aspects of the present invention, reference is now made in detail to the description of the embodiments as illustrated in the drawings. While the several embodiments are described in connection with these drawings, there is no intent to limit the invention to the embodiment or embodiments disclosed herein. On the contrary, the intent is to cover all alternatives, modifications, and equivalents included within the spirit and scope of the invention as defined by the appended claims.

FIG. 1 is a block diagram showing a digital communication system 100. In this non-limiting example environment, a central office 110 is connected to a customer premises 160 via a two-conductor pair wire 155. On the side of the central office 110 an ADSL service rack 140 gathers information for transmission. This information may be in the form of video conferencing 115, Internet 120, telephone services 125, movies on demand 130, or broadcast media 135. All of this information is gathered at a digital subscriber line access multiplexer (DSLAM) 145, which assembles the data for transmission by ADSL modems 150. Once this information has been coded and framed, it is sent to the customer premises 160 via a local loop, which is generally a two-conductor pair wire 155. The data is received at the customer premises 160 by an ADSL modem 180. This information is then decoded and provided to the user. Several non-limiting examples of this include a fax 165, a user's computer 170, a television set 175, an analog telephone 185, or, in the alternative, a digital telephone 195.

Figure 2:
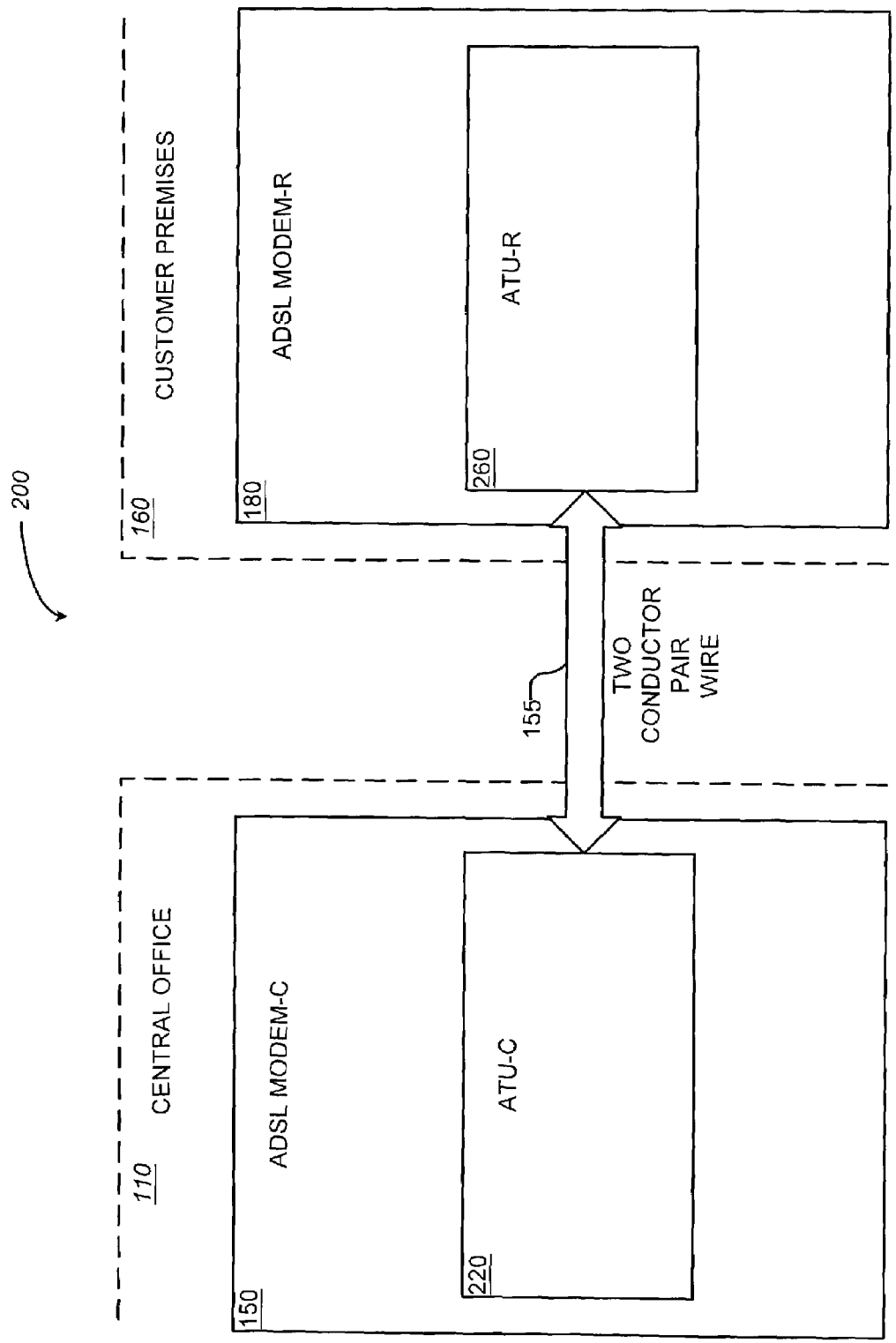
FIG. 2 is a block diagram showing components of the ADSL modem of FIG. 1 in greater detail.

FIG. 2 is a block diagram showing an exploded view of the ADSL modems 120, 180 at the central office 110 and the customer premises 160 of FIG. 1. As shown in FIG. 2, the ADSL modem 150 at the central office 110 includes an ADSL transceiver unit (ATU-C) 220 that is configured to transmit downstream data and receive upstream data through the two-conductor pair wire 155 (also referred to herein as a local loop). On the other end of the local loop 155, at the ADSL modem 180 of the customer premises 160, a remote ADSL transceiver unit (ATU-R) 260 is configured to receive the downstream data from the ATU-C 220 and transmit the upstream data from the ATU-R 260 to the ATU-C 220. Typically, the ATU-C 220 sets its gain so that it is high enough to sufficiently satisfy the signal-to-noise ratio (SNR) requirements but not so high that it results in "clipping" of a signal. Thus, if a spike (or peak) exists in a transmitted signal, then the gain is reduced to accommodate the spike. This is done at the cost of reducing the SNR of the overall signal. Since the PAR value for a Fourier-based system is defined as:

$$PAR = \frac{(\max_{t \in [0,2\pi]} |p(t)|)^2}{\frac{1}{2\pi} \int_0^{2\pi} |p(t)|^2 \, dt},$$

where p(t) represents a signal shape, it can be seen that the PAR value is large when certain criteria are met. Non-limiting examples of high-PAR value situations are shown in FIGS. 3A and 3B.

Figure 3A:
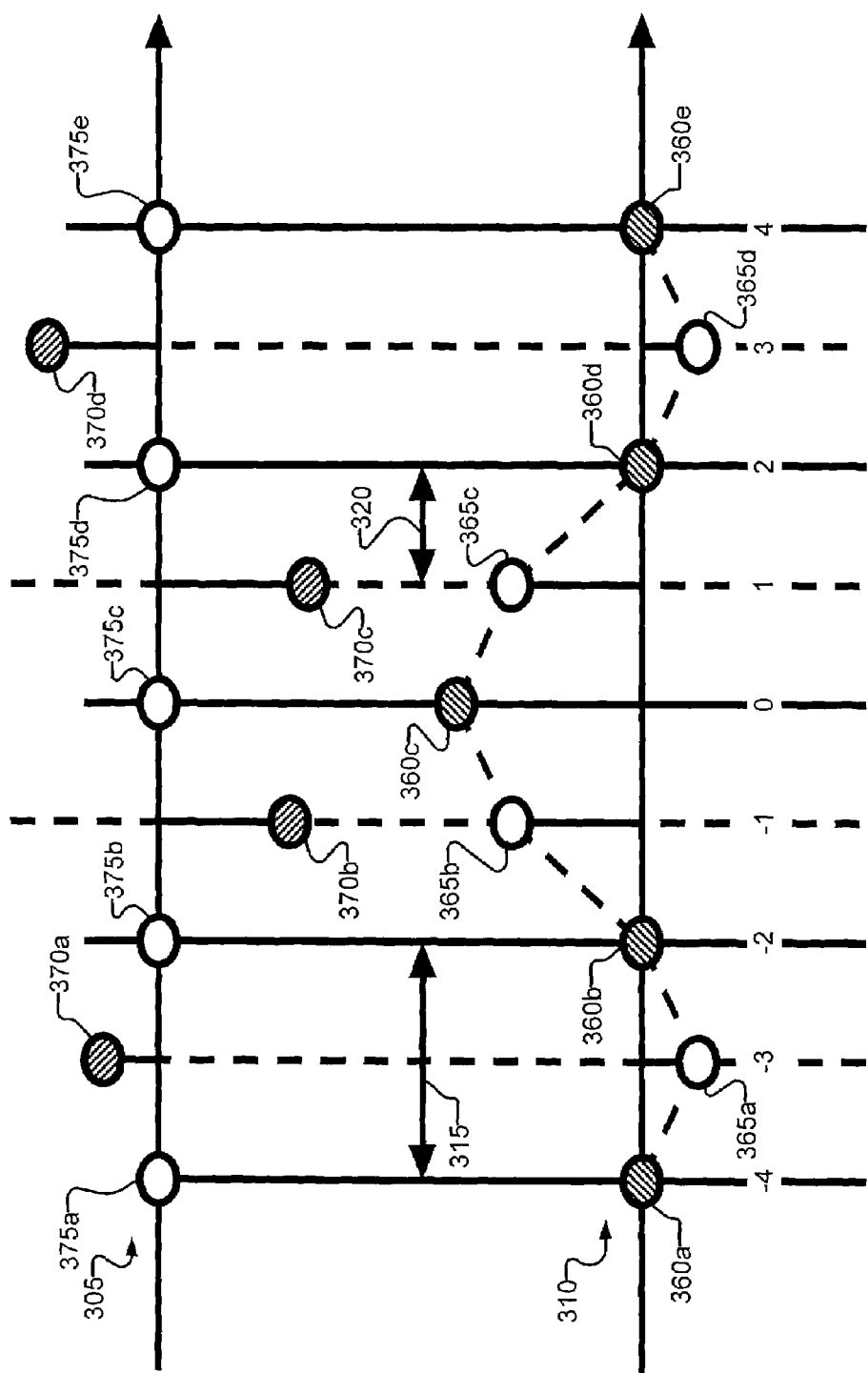
FIG. 3A is a graph illustrating an upsampled signal and an interpolated impulse response.
Figure 3B:
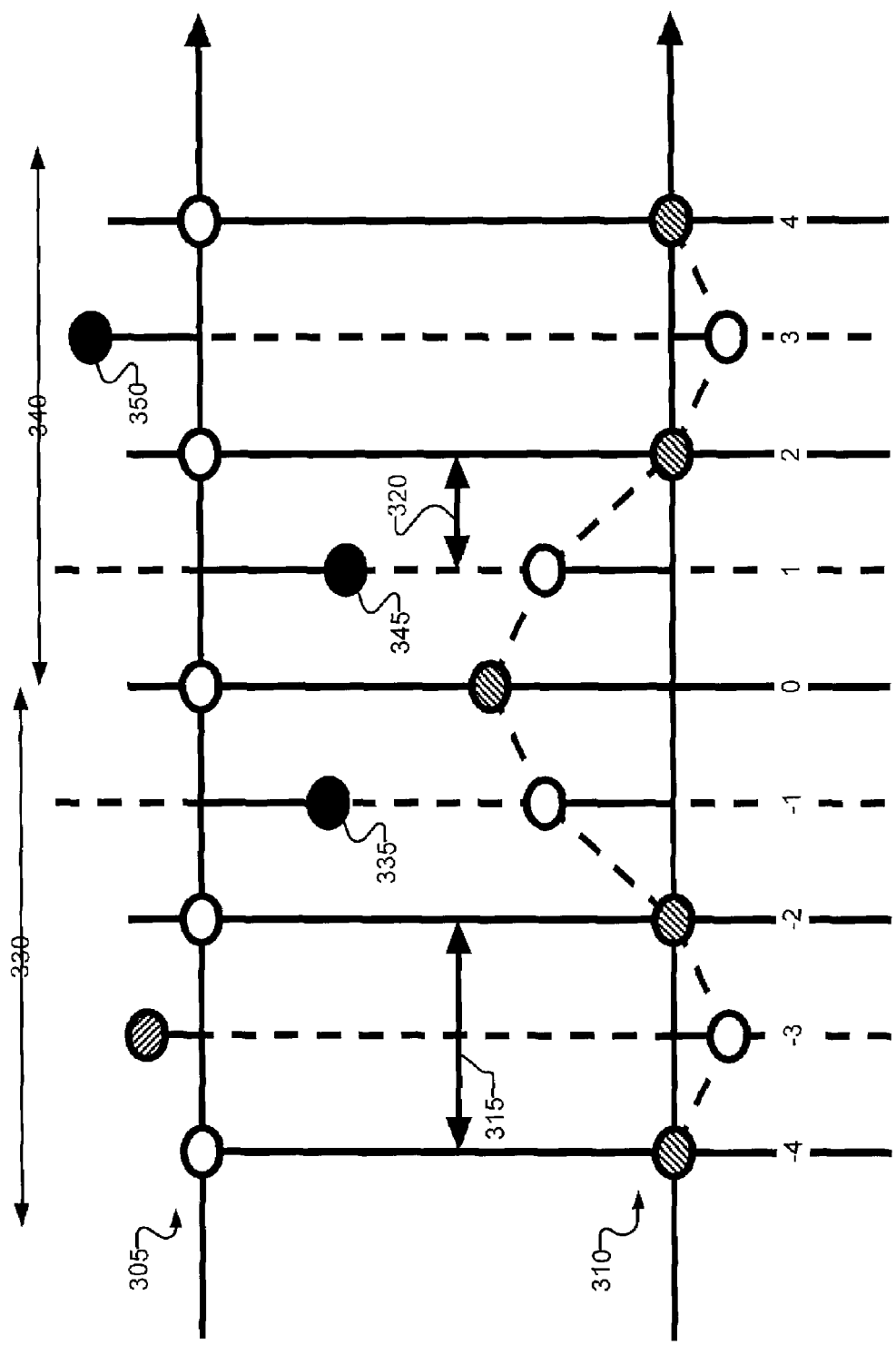
FIG. 3B is a graph illustrating an upsampled signal and an interpolated impulse response in a high peak-to-average ratio (PAR) value situation.

FIG. 3A is a graph illustrating an upsampled signal 305 and an interpolated impulse response 310. Points associated with an impulse response are shown in FIG. 3A as shaded circles 360a, 360b, 360c, 360d, 360e, while the interpolated points are shown as clear circles 365a, 365b, 365c, 365d. Similarly, points associated with the signal are shown in shaded circles 370a, 370b, 370c, 370d, while the upsampled points are shown in clear circles 375a, 375b, 375c, 375d, 375e. The time interval between the raw data points is represented as T, while the time interval between the interpolated data points is represented as $$\frac{T}{K}.$$

Figure 4:
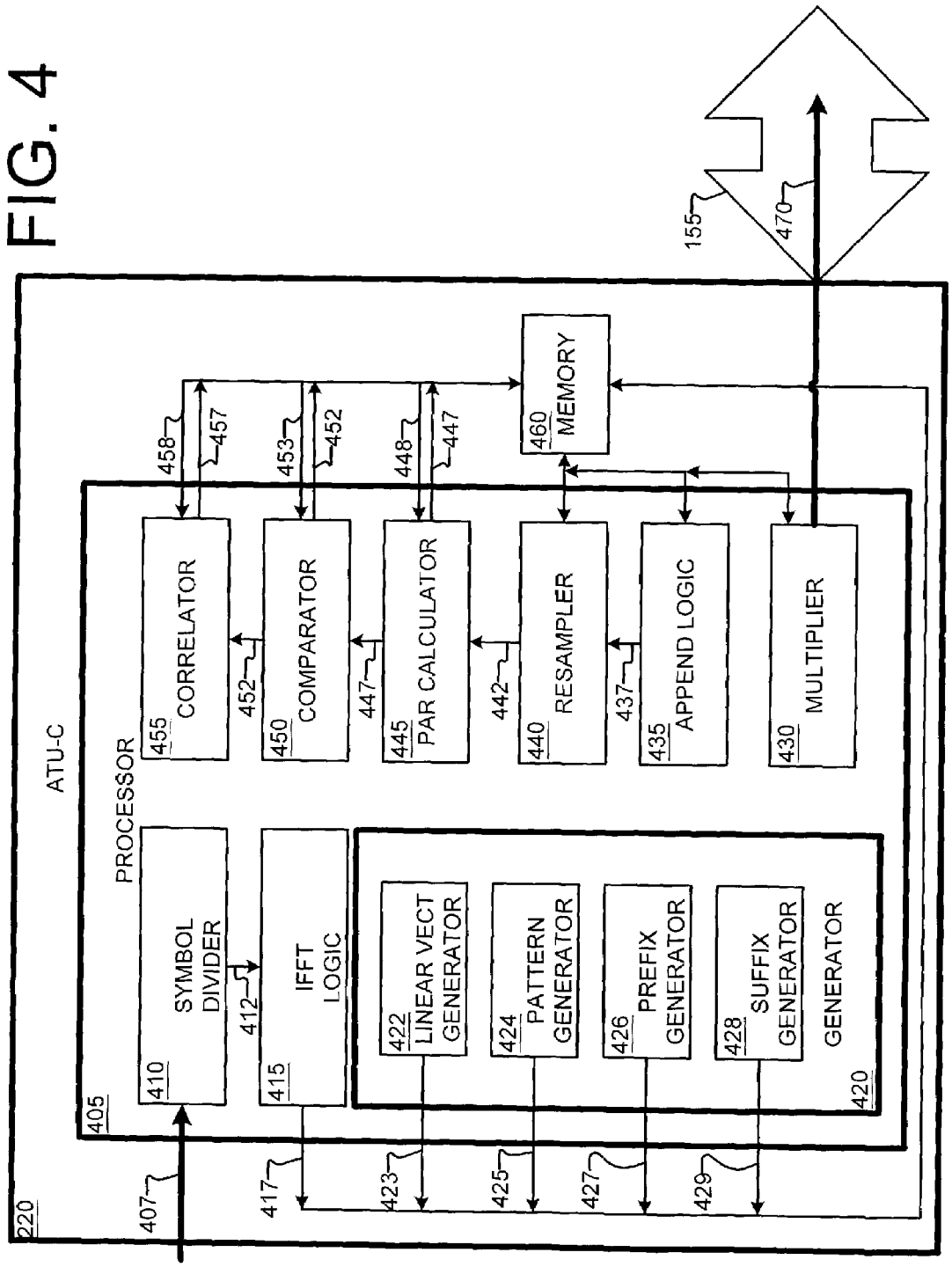
FIG. 4 is a block diagram showing, in greater detail, a processor in the ADSL transceiver unit (ATU) of FIG. 4.

For the specific example of FIG. 3A, K is set to 2. As seen here, a signal may have a reasonable negative peak 370c prior to upsampling. However, a simple upsampling may transform the signal into a high PAR value signal due to the higher rate filtering (i.e., $$\frac{T}{K}$$

filtering). For at least this reason, it is desirable to implement PAR value reduction techniques on an interpolated signal (i.e., a signal that has passed through an interpolation filter), rather than implementing PAR value reduction techniques on raw signals (i.e., signals prior to interpolation). One embodiment of a system configured to reduce PAR values is shown in FIG. 4, and several embodiments of methods for reducing PAR values are shown in FIGS. 5A through 7. Thus, details related to reducing PAR values are discussed with reference to FIGS. 4 through 7.

FIG. 3B is a graph illustrating an upsampled signal 305 and an interpolated impulse response 310 in a boundary condition exhibiting a high PAR value. In addition to having potentially high PAR values within a symbol, it is possible to have high boundary values between symbols. Given two adjacent symbols (e.g., a first symbol 330 and a second symbol 340 adjacent to the first symbol 330) at a regular sampling rate of T, if:

(1) a last sample 335 of the first symbol 330 and a first sample 345 of the second symbol 340 have the same sign (i.e., both positive or both negative);

(2) the first sample 345 of the second symbol 340 and the second sample 350 of the second symbol 340 have different signs (i.e., one is positive and the other is negative); and (3) the first sample 345 of the second symbol 340 has a high magnitude, then a high PAR value may result due to boundary conditions. One embodiment of a system for reducing PAR values due to bad boundary conditions is shown in FIG. 4, and one embodiment of a method for ameliorating high PAR values due to bad boundary conditions is shown in FIGS. 5C through 7. Thus, details related to reducing PAR values due to bad boundary conditions are discussed with reference to FIGS. 4 through 9.

FIG. 4 is a block diagram showing, in greater detail, a processor 405 in the ADSL transceiver unit (ATU-C) 220 of FIG. 4. In the specific context of digital subscriber line (DSL) systems employing discrete multi-tone (DMT) technology, data is transmitted in a plurality of real-valued symbols k containing N time samples at a regular sampling rate of $$\frac{1}{T}.$$

Thus, each symbol may be represented as $x_k[n]$, wherein $0 \leq n \leq (N-1)$. In other words, the symbol k may be obtained after an N-dimensional inverse Fourier transform (IFT) of $x_k[n]$. In one embodiment of the system, a symbol divider 410 in the processor 405 receives a symbol 407 and divides the symbol 407 into non-overlapping subsets of symbols 412. Thus, the symbol $x_k[n]$ is received by the symbol divider 410, and separated into Q non-overlapping subsets of symbols $x_k^{(l)}[n]$ such that:

$$\sum_{l=1}^{Q} (x_k^{(l)}[n]) = x_k[n].$$

Stated differently, the non-overlapping subsets of symbols 412 may be derived using a series of invertible and complete operators $O^{(l)}\{\ \}$ such that:

$$O^{(l)}\{x_k[n]\}=x_k^{(l)}[n],$$

thereby generating a Q-dimensional vector:

$$x_k[n] = \begin{bmatrix} x_k^{(1)}[n] \\ \ldots \\ x_k^{(l)}[n] \\ \ldots \\ x_k^{(Q)}[n] \end{bmatrix}.$$

In a preferred embodiment, the non-overlapping subsets of symbols $x_k^{(l)}[n]$ may be generated so that each subset of symbols $x_k^{(l)}[n]$ is represented by:

$$x_k^{(i)}[n] = \frac{1}{N} 2Re\left\{ \sum_{h=1}^{P_l} e^{j2\pi \frac{nm_h^{(i)}}{N}} a_k^{m_h^{(i)}} \right\},$$

where $a_k^{m_h^{(l)}}$ is a mapped complex value assigned to bin $m_h^{(l)}$ for symbol k, based on a bin allocation algorithm. It will be clear to one of ordinary skill in the art that either uniform or non-uniform dividing may be applied depending on system constraints. In any event, the non-overlapping subsets of symbols 412 are received by IFT logic 415, which performs an IFT on each of the non-overlapping subsets of symbols 412 to produce time-domain subsets 417, which are stored in memory 460 as a Q-dimensional time-domain signal.

The processor 405 also comprises a linear vector generator 422, a pattern generator 424, a multiplier 430, and append logic 435. The linear vector generator 422 generates Q-dimensional linear vectors $e^{(m)}$ 423, which are used to reduce PAR values. In a preferred embodiment, the Q-dimensional linear vectors 423 are binary vectors having, as their elements, either 1 or −1. Thus, given that each linear vector 423 is a binary vector having Q elements, there are a total of $2^Q$ possible binary vectors that may be generated by the linear vector generator 422. Specifically, if all the elements of the linear vector 423 are 1, then the linear vector 423 is designated as a unit vector:

$$e^{(1)} = \begin{bmatrix} 1 \\ \ldots \\ 1 \\ \ldots \\ 1 \end{bmatrix}$$

such that:

$$e^{(l)T}x_k[n]=x_k[n].$$

In operation, the linear vector generator 422 generates a Q-dimensional linear vector $e^{(m)}$ 423 and stores the Q-dimensional linear vector $e^{(m)}$ 423 in memory 630. The multiplier 430 retrieves both the stored Q-dimensional time-domain signal 417 and the stored Q-dimensional linear vector $e^{(m)}$ 423, and multiplies the retrieved Q-dimensional time-domain signal 417 with the retrieved Q-dimensional linear vector $e^{(m)}$ 423, thereby producing a combined sequence. The combined sequence is stored in memory 460.

The pattern generator 424 generates pattern signals $pat^{(m)}[n]$ 425, which correspond to the generated linear vectors $e^{(m)}$ 423. Thus, for every linear vector $e^{(m)}$ 423, there is a corresponding Q-bit pattern signal $pat^{(m)}[n]$ 425. In operation, the generated Q-bit pattern signal $pat^{(m)}[n]$ 425 is stored in memory 460 for use by the append logic 435. The append logic 435 retrieves the stored Q-bit pattern signal $pat^{(m)}[n]$ 425 and the stored combined sequence, and appends the Q-bit pattern signal $pat^{(m)}[n]$ 425 to the combined sequence, thereby producing a patterned sequence $y_k^{(m)}$, such that:

$$y_k^{(m)}=e^{(m)T}x_k[n]+pat^{(m)}[n].$$

As seen here, since there are a total of $2^Q$ linear vectors $e^{(m)}$ 423, a total of $2^Q$ corresponding patterned sequences are generated 405.

In one embodiment of the invention, the $2^Q$ combined sequences are upsampled by a resampler 440 to produce interpolated sequences 442. Thus, if the sampling period is given as $$\frac{T}{K},$$

then the Kn data points in the upsampled sequence $\vec{x}_k[Kn-v]$ are equal to the data points $x_k[n]$. Furthermore, the additional points $\vec{x}_k[Kn+v]$ due to upsampling are equal to 0 for $1 \leq v \leq (K-1)$. Thus, if a resampler 440 response at $$\frac{T}{K}$$

is given as $g_l[r]$, then an upsampling by the resampler 440 results in an interpolated sequence 442 of:

$$\tilde{x}_k[q] = \sum_r \left( g_l\left[r\frac{T}{K}\right]\vec{x}_k\left[(q-r)\frac{T}{K}\right]\right).$$

If the interpolated sequence 442 is a result of upsampling the combined sequence, then this may be represented as $\tilde{y}_k^{(m)}[q]$. As shown here, if the linear vectors $e^{(m)}$ 423 are Q-bit vectors, then a total of $2^Q$ sequences of $\tilde{y}_k^{(m)}[q]$ are produced, wherein each $\tilde{y}_k^{(m)}[q]$ has a unique appended pattern signal $pat^{(m)}[n]$ 425 and corresponds to a unique linear vector $e^{(m)}$ 423. In one embodiment of the invention, the PAR for each $\tilde{y}_k^{(m)}[q]$ is calculated by a PAR calculator 445, and the calculated PAR values for $\tilde{y}_k^{(m)}[q]$ are stored in memory 460. A comparator 450 retrieves the calculated PAR values and compares the PAR values in order to determine the lowest PAR value. Once the lowest PAR value has been determined by the comparator 450, a correlator 455 correlates the lowest PAR value with the linear vector $e^{(mm)}$, which corresponds to the lowest PAR value (also referred to herein as an optimal linear vector $e^{(mm)}$. The optimal linear vector $e^{(mm)}$ is then stored in memory 460. The multiplier 430 retrieves the Q-dimensional time-domain signal 417 and the optimal linear vector $e^{(mm)}$, and the multiplier 430 multiplies the Q-dimensional time-domain signal 417 with the transpose of the optimal linear vector $e^{(mm)T}$ to produce an optimal PAR-value sequence, which is relayed to the append logic 435. The append logic 435 retrieves the pattern signal $pat^{(mm)}[n]$ that corresponds to the optimal linear vector $e^{(mm)}$ and appends $pat^{(mm)}[n]$ to the optimal PAR-value sequence to produce an optimal patterned sequence $\tilde{y}_k^{(mm)}[q]$. The optimal patterned sequence is then transmitted by the ATU-C 220.

Since the transmitted sequence has an appended pattern signal $pat^{(mm)}[n]$, once the sequence has been received at a receive site, the receive site may extract the pattern from the received sequence and reconstruct the sub-sequences using the extracted pattern signal $pat^{(mm)}[n]$. Since the sub-sequences are non-overlapping complete portions of the symbol (i.e., $$\sum_{i=1}^{Q} (x_k^{(l)}[n]) = x_k[n]),$$

the reconstructed sub-sequences may simply be concatenated to produce the transmitted symbol. Since the transmitted sequence has been configured to produce the lowest PAR value (i.e., $e^{(mm)}$ has been appropriately chosen), the system as described above may be seen as reducing the PAR value of a transmitted symbol. Further details associated with PAR value reduction are discussed with reference to FIGS. 5A through 7.

While the linear vector $e^{(mm)}$ that produces the lowest PAR value may be useful in reducing PAR values associated with peaks within a symbol, the above sequence may need to be further modified to account for intersymbol interference. In another embodiment of the invention, once $y_k^{(m)}[n]$ have been derived, a cyclic prefix of length L may be appended to the beginning of $y_k^{(m)}[n]$ to account for intersymbol interference. In this sense, a cyclic prefix is generated by a prefix generator 426. The cyclic prefix is appended to $y_k^{(m)}[n]$ by the append logic 435, thereby producing a prefixed sequence $y_k^{(m)'}[n]$ for $-L \leq n \leq (N-1)$, such that:

$$y_k^{(m)'}[n] = y_k^{(m)}[n]$$

for $0 \leq n \leq (N-1)$, and $$y_k^{(m)'}[n] = y_k^{(m)}[n+N]$$

for $-L \leq n \leq -1$.

Once $y_k^{(m)'}[n]$ has been derived, the PAR for each $y_k^{(m)'}[n]$ is calculated by a PAR calculator 445, and the calculated PAR values for $y_k^{(m)'}[n]$ are stored in memory 460. A comparator 450 retrieves the calculated PAR values and compares the PAR values to determine the lowest PAR value. Once the lowest PAR value has been determined by the comparator 450, a correlator 455 correlates the lowest PAR value with the linear vector $e^{(mm)}$ which corresponds to the lowest PAR value (also referred to herein as an optimal linear vector $e^{(mm)}$. The optimal linear vector $e^{(mm)}$ is then stored in memory 460. The multiplier 430 retrieves the Q-dimensional time-domain signal 417 and the optimal linear vector $e^{(mm)}$, and the multiplier 430 multiplies the Q-dimensional time-domain signal 417 with the transpose of the optimal linear vector $e^{(mm)T}$ to produce an optimal PAR-value sequence, which is relayed to the append logic 435. The append logic 435 retrieves the pattern signal $pat^{(mm)}[n]$ that corresponds to the optimal linear vector $e^{(mm)}$ and appends $pat^{(mm)}[n]$ to the optimal PAR-value sequence to produce an optimal patterned sequence $y_k^{(mm)}[n]$. The optimal patterned sequence is then transmitted by the ATU-C 220.

Since the transmitted sequence has an appended pattern signal $pat^{(mm)}$, and since the appended prefix is cyclic (i.e., duplicative of the last values of the sequence), once the sequence has been received at a receive site, the receive site may reconstruct the sub-sequences using the pattern signal $pat^{(mm)}[n]$ and the known cyclic prefix information. Since the sub-sequences are non-overlapping complete portions of the symbol (i.e., $$\sum_{i=1}^{Q} (x_k^{(l)}[n]) = x_k[n]),$$

the reconstructed sub-sequences may simply be concatenated to produce the transmitted symbol. Since the transmitted sequence has been configured to produce the lowest PAR value (i.e., $e^{(mm)}$ has been appropriately chosen), the system as described above may be seen as reducing the PAR value of a transmitted symbol. Further details associated with PAR value reduction are discussed with reference to FIGS. 5A through 7.

While the above sequence may further reduce intersymbol interference, in order to further reduce large PAR values associated with boundary conditions, the sequence may need to be further modified. In another embodiment of the invention, once prefixed $y_k^{(m)'}[n]$ have been derived, a suffix of length J may be further added to the sequence to account for the boundary conditions. In this sense, the suffix is generated by a suffix generator 428. The suffix is appended to the end of $y_k^{(m)'}[n]$ by the append logic 435, thereby producing a suffixed sequence $y_k^{(m)''}[n]$ for $-L \leq n \leq (N+J-1)$, such that:

$$y_k^{(m)''}[n] = y_k^{(m)}[n]$$

for $0 \leq n \leq (N-1)$, $$y_k^{(m)''}[n] = y_k^{(m)}[n+N]$$

for $-L \leq n \leq -1$, and $$y_k^{(m)''}[n] = s_k^{(m)}[n]$$

for $N \leq n \leq (N+J-1)$. As explained with reference to FIG. 3B, high PAR values for certain boundary conditions arise due to the values of the boundary samples (i.e., the last sample 335 (FIG. 3B) of the first symbol 330 (FIG. 3B), the first sample 345 (FIG. 3B) of the second symbol 340 (FIG. 3B), and the second sample 350 (FIG. 3B) of the second symbol 340 (FIG. 3B)). Thus, $s_k^{(m)}[n]$ may be set to compensate for the boundary conditions by using tuning parameters α and β such that:

$$s_k^{(m)}[N] = \{y_k^{(m)}[N-1]\}\alpha\sigma$$

where σ is the standard deviation of the system, and $$s_k^{(m)}[N+1] = -\{y_k^{(m)}[N-1]\}\alpha\beta.$$

These tuning parameters may be derived during initialization, and may depend on channel characteristics known by both the ATU-C 220 (FIG. 2) and the ATU-R 260 (FIG. 2). Thus, by manipulating the amplitude and sign of the values of the boundary samples, the PAR value due to boundary conditions between symbols may be further reduced.

Once $y_k^{(m)''}[n]$ has been derived, the PAR for each $y_k^{(m)''}[n]$ is calculated by a PAR calculator 445, and the calculated PAR values for each $y_k^{(m)''}[n]$ are stored in memory 460. A comparator 450 retrieves the calculated PAR values and compares the PAR values to determine the lowest PAR value. Once the lowest PAR value has been determined by the comparator 450, a correlator 455 correlates the lowest PAR value with the linear vector $e^{(mm)}$ that corresponds to the lowest PAR value (hereinafter also referred to as an optimal linear vector $e^{(mm)}$. The optimal linear vector $e^{(mm)}$ is then stored in memory 460. The multiplier 430 retrieves the Q-dimensional time-domain signal 417 and the optimal linear vector $e^{(mm)}$. The Q-dimensional time-domain signal 417 is multiplied by the transpose of the optimal linear vector $e^{(mm)T}$ to produce an optimal PAR-value sequence, which is relayed to the append logic 435. The append logic 435 retrieves the pattern signal $pat^{(mm)}[n]$ that corresponds to the optimal linear vector $e^{(mm)}$ and appends $pat^{(mm)}[n]$ to the optimal PAR-value sequence to produce an optimal patterned sequence $y_k^{(mm)''}[n]$. The optimal patterned sequence is transmitted by the ATU-C 220.

Since the transmitted sequence has an appended pattern signal $pat^{(mm)}[n]$, and since the suffix is determined by tuning parameters determined during initialization, once the sequence has been received at a receive site, the receive site may reconstruct the sub-sequences using the pattern signal $pat^{(mm)}[n]$ and other known parameters. Since the sub-sequences are non-overlapping complete portions of the symbol (i.e., $$\sum_{i=1}^{Q} (x_k^{(l)}[n]) = x_k[n]),$$

the reconstructed sub-sequences may simply be concatenated to produce the transmitted symbol. Since the transmitted sequence has been configured to produce the lowest PAR value (i.e., $e^{(mm)}$ has been appropriately chosen), the system as described above may be seen as reducing the PAR value of a transmitted symbol. Further details associated with PAR value reduction are discussed with reference to FIGS. 5A through 7.

Having described several embodiments of systems for reducing PAR values, attention is turned to FIGS. 5A through 7, which show several embodiments of methods for reducing PAR values.

Figure 5A:
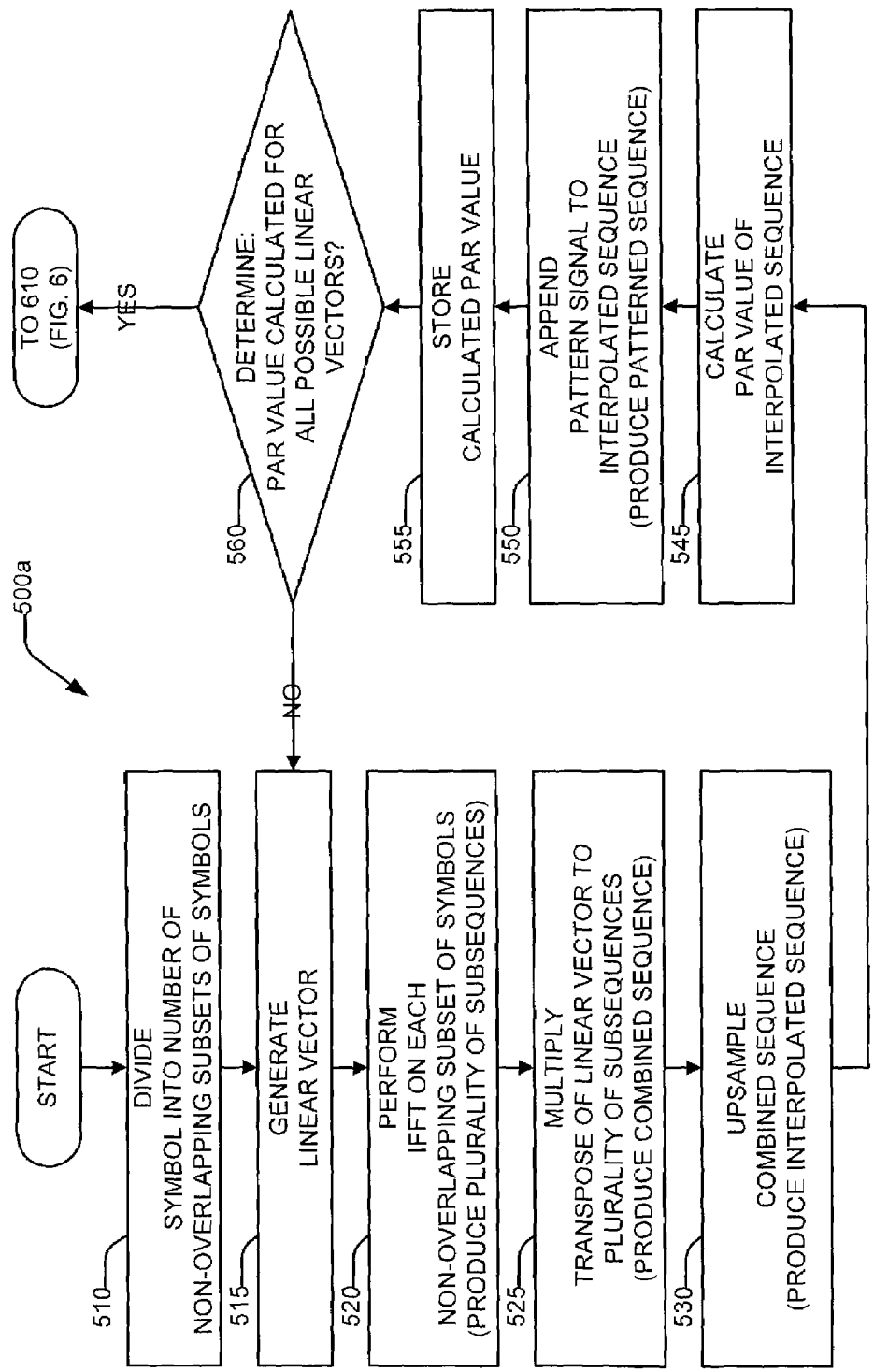
FIG. 5A is a flowchart showing steps associated with one embodiment of the invention.

FIG. 5A is a flowchart showing steps 500a associated with one embodiment of the invention. As shown in FIG. 5A, one embodiment of the method begins by dividing, in step 510, a symbol $x_k[n]$ into a number of non-overlapping subsets of symbols $x_k^{(l)}[n]$. In one embodiment, the symbol divider 410 (FIG. 4) may be used to divide 510 the symbol $x_k[n]$. Thus, the symbol $x_k[n]$ is divided 510 into Q non-overlapping subsets of symbols $x_k^{(l)}[n]$ such that:

$$\sum_{i=1}^{Q} (x_k^{(l)}[n]) = x_k[n].$$

Stated differently, the non-overlapping subsets of symbols $x_k^{(m)}[n]$ may be derived using a series of invertible and complete operators $O^{(l)}\{\ \}$ such that:

$$O^{(l)}\{x_k[n]\} = x_k^{(l)}[n],$$

thereby generating a Q-dimensional vector:

$$x_k[n] = \begin{bmatrix} x_k^{(l)}[n] \\ \ldots \\ x_k^{(i)}[n] \\ \ldots \\ x_k^{(Q)}[n] \end{bmatrix}.$$

Once the symbol $x_k[n]$ has been divided 510, a linear vector $e^{(m)}$ is generated, in step 515. In a preferred embodiment, the linear vector $e^{(m)}$ is a Q-dimensional binary vector having, as its elements, either 1 or −1. Upon generating 515 the linear vector $e^{(m)}$, an IFT is performed, in step 520, on each non-overlapping subset of symbols $x_k^{(l)}[n]$ to produce a plurality of sub-sequences. The plurality of sub-sequences is then multiplied, in step 525, by the transpose of the linear vector $e^{(m)T}$ to produce a combined sequence. The combined sequence is upsampled, in step 530, to produce an interpolated sequence $\tilde{y}_k^{(m)}[q]$. Upon upsampling 530, a PAR value for $\tilde{y}_k^{(m)}[q]$ is calculated, in step 545, and the calculated 545 PAR value is stored, in step 555. Furthermore, upon upsampling 530, a pattern signal $pat^{(m)}[n]$ is appended, in step 550, to the interpolated sequence $\tilde{y}_k^{(m)}[q]$ to produce a patterned sequence $y_k^{(m)}$, such that:

$$y_k^{(m)} = e^{(m)T} x_k[n] + pat^{(m)}[n].$$

Once a patterned sequence $y_k^{(m)}$ has been produced and a PAR value has been stored 555 for the interpolated sequence, it is determined, in step 560, whether or not a PAR value has been calculated for interpolated sequences generated by all of the possible linear vectors $e^{(m)}$. If the PAR value for all possible interpolated sequences has not been calculated, then the process repeats from step 515, wherein another linear vector $e^{(m)}$ is generated. If, on the other hand, PAR values for all possible linear vectors $e^{(m)}$ have been calculated (i.e., $2^Q$ PAR values have been calculated), then the method steps exit to FIG. 6.

In a preferred embodiment, the method steps of FIG. 5A are performed by the processor 405 of FIG. 4. However, it will be clear to one of ordinary skill in the art that the method steps may also be performed by other systems.

Figure 5B:
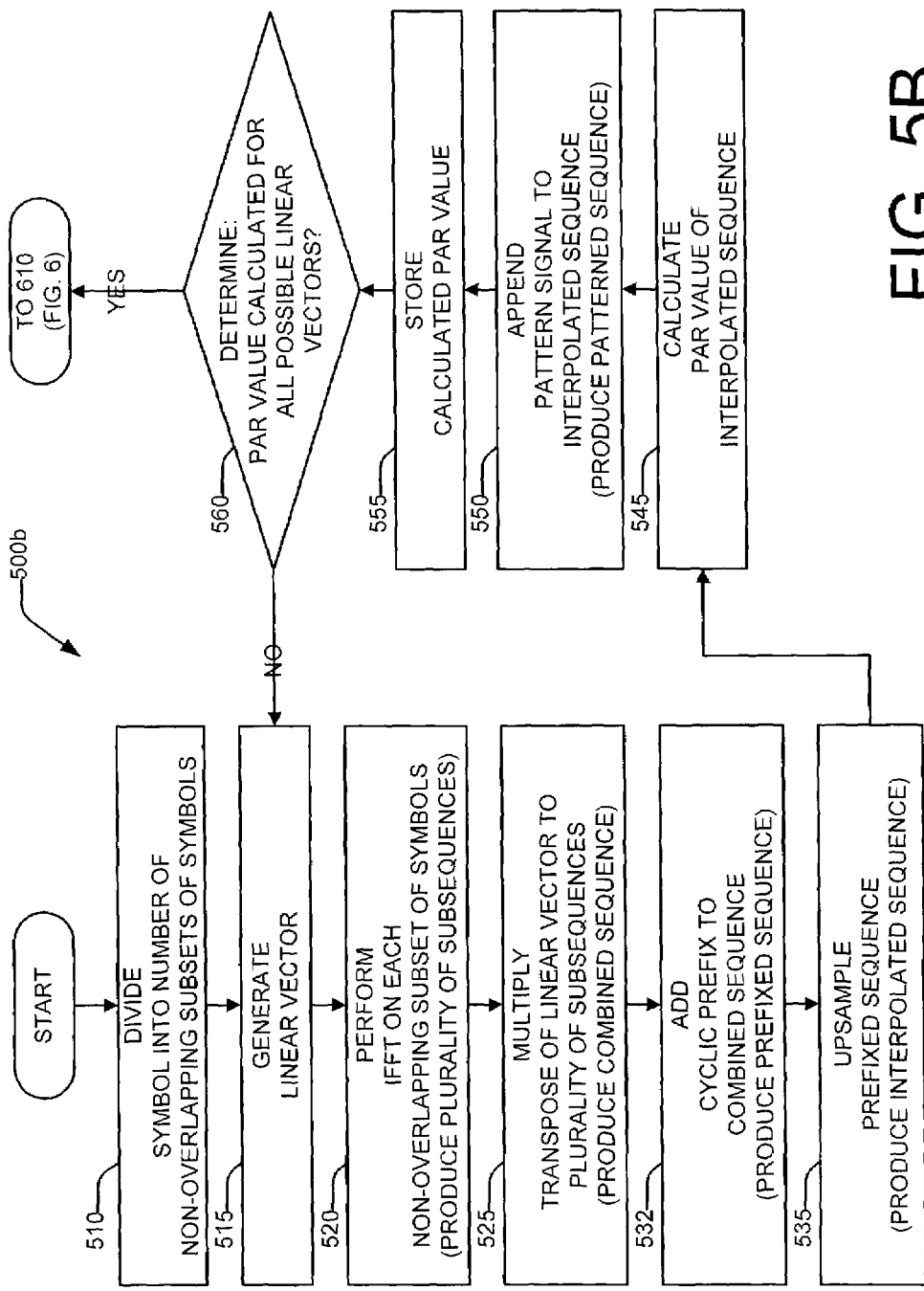
FIG. 5B is a flowchart showing steps associated with another embodiment of the invention.

FIG. 5B is a flowchart showing steps 500b associated with another embodiment of the invention. As shown in FIG. 5B, one embodiment of the method begins by dividing, in step 510, a symbol $x_k[n]$ into a number of non-overlapping subsets of symbols $x_k^{(l)}[n]$. In one embodiment, the symbol divider 410 (FIG. 4) may be used to divide 510 the symbol $x_k[n]$. Thus, the symbol $x_k[n]$ is divided 510 into Q non-overlapping subsets of symbols $x_k^{(l)}[n]$ such that:

$$\sum_{i=1}^{Q} \left( x_k^{(l)}[n] \right) = x_k[n].$$

Stated differently, the non-overlapping subsets of symbols $x_k^{(l)}[n]$ may be derived using a series of invertible and complete operators $O^{(l)}\{\ \}$ such that:

$$O^{(l)}\{x_k[n]\} = x_k^{(l)}[n],$$

thereby generating a Q-dimensional vector:

$$x_k[n] = \begin{bmatrix} x_k^{(l)}[n] \\ \ldots \\ x_k^{(i)}[n] \\ \ldots \\ x_k^{(Q)}[n] \end{bmatrix}.$$

Once the symbol $x_k[n]$ has been divided 510, a linear vector $e^{(m)}$ is generated, in step 515. In a preferred embodiment, the linear vector $e^{(m)}$ is a Q-dimensional binary vector having, as its elements, either 1 or –1. Upon generating 515 the linear vector $e^{(m)}$, an IFT is performed, in step 520, on each non-overlapping subset of symbols $x_k^{(l)}[n]$ to produce a plurality of sub-sequences. The plurality of sub-sequences is then multiplied, in step 525, by the transpose of the linear vector $e^{(m)T}$ to produce a combined sequence. A cyclic prefix is added, in step 532, to the combined sequence to produce a prefixed sequence $y_k^{(m)'}[n]$ for $-L \leq n \leq (N-1)$, such that:

$$y_k^{(m)'}[n] = y_k^{(m)}[n]$$

for $0 \leq n \leq (N-1)$, and $$y_k^{(m)'}[n] = y_k^{(m)}[n+N]$$

for $-L \leq n \leq -1$. The prefixed sequence $y_\lambda^{(m)}[n]$ is upsampled, in step 535, to produce an interpolated sequence. Upon upsampling 535, a PAR value for the interpolated sequence is calculated, in step 545, and the calculated 545 PAR value is stored, in step 555. Furthermore, upon upsampling 535, a pattern signal $pat^{(m)}[n]$ is appended, in step 550, to the interpolated sequence to produce a patterned sequence. Once a patterned sequence has been produced and a PAR value has been stored 555 for the interpolated sequence, it is determined, in step 560, whether or not a PAR value has been calculated for interpolated sequences generated by all of the possible linear vectors $e^{(m)}$. If the PAR value for all of the possible interpolated sequences has not been calculated, then the process repeats from step 515, wherein another linear vector $e^{(m)}$ is generated. If, on the other hand, PAR values for all possible linear vectors $e^{(m)}$ have been calculated (i.e., $2^Q$ PAR values have been calculated), then the method steps exit to FIG. 6.

In a preferred embodiment, the method steps of FIG. 5B are performed by the processor 405 of FIG. 4. However, it will be clear to one of ordinary skill in the art that the method steps may also be performed by other systems.

FIG. 5C is a flowchart showing steps 500c associated with another embodiment of the invention. As shown in FIG. 5C, one embodiment of the method begins by dividing, in step 510, a symbol $x_k[n]$ into a number of non-overlapping subsets of symbols $x_k^{(l)}[n]$. In one embodiment, the symbol divider 410 (FIG. 4) may be used to divide 510 the symbol $x_k[n]$. Thus, the symbol $x_k[n]$ is divided 510 into Q non-overlapping subsets of symbols $x_k^{(l)}[n]$ such that:

$$\sum_{i=1}^{Q} \left( x_k^{(l)}[n] \right) = x_k[n].$$

Stated differently, the non-overlapping subsets of symbols $x_k^{(l)}[n]$ may be derived using a series of invertible and complete operators $O^{(l)}\{\ \}$ such that:

$$O^{(l)}\{x_k[n]\} = c_k^{(l)}[n],$$

thereby generating a Q-dimensional vector:

$$x_k[n] = \begin{bmatrix} x_k^{(l)}[n] \\ \ldots \\ x_k^{(i)}[n] \\ \ldots \\ x_k^{(Q)}[n] \end{bmatrix}.$$

Once the symbol $x_k[n]$ has been divided 510, a linear vector $e^{(m)}$ is generated, in step 515. In a preferred embodiment, the linear vector $e^{(m)}$ is a Q-dimensional binary vector having, as its elements, either 1 or –1. Upon generating 515 the linear vector $e^{(m)}$, an IFT is performed, in step 520, on each non-overlapping subset of symbols $x_k^{(l)}[n]$ to produce a plurality of sub-sequences. The plurality of sub-sequences is then multiplied, in step 525, by the transpose of the linear vector $e^{(m)T}$ to produce a combined sequence. A cyclic prefix is added, in step 532, to the combined sequence to produce a prefixed sequence $y_k^{(m)'}[n]$ for $-L \leq n \leq (N-1)$, such that:

$$y_k^{(m)'}[n] = y_k^{(m)}[n]$$

for $0 \leq n \leq (N-1)$, and $$y_k^{(m)'}[n] = y_k^{(m)}[n+N]$$

for $-L \leq n \leq -1$. A suffix is also added, in step 537, to the prefixed sequence to produce a suffixed sequence $y_k^{(m)''}[n]$ for $-L \leq n \leq (N+J-1)$, such that:

$$y_k^{(m)''}[n] = y_k^{(m)}[n]$$

for $0 \leq n \leq (N-1)$, $$y_k^{(m)''}[n] = y_k^{(m)}[n+N]$$

for $-L \leq n \leq -1$, and $$y_k^{(m)''}[n] = s_k^{(m)}[n]$$

for $N \leq n \leq (N+J-1)$. As explained with reference to FIG. 3B, high PAR values for certain boundary conditions arise due to the values of the boundary samples (i.e., the last sample 335 (FIG. 3B) of the first symbol 330 (FIG. 3B), the first sample 345 (FIG. 3B) of the second symbol 340 (FIG. 3B), and the second sample 350 (FIG. 3B) of the second symbol 340 (FIG. 3B)). Thus, $s_k^{(m)}[n]$ may be set to compensate for the boundary conditions by using tuning parameters α and β0 such that:

$$s_k^{(m)}[N] = \{y_k^{(m)}[N-1]\}\alpha\sigma$$

where σ is the standard deviation of the system, and $$s_k^{(m)}[N+1] = \{y_k^{(m)}[N-1]\}\alpha\beta$$

These tuning parameters may be derived during initialization, and may depend on channel characteristics known by both the ATU-C 220 (FIG. 2) and the ATU-R 260 (FIG. 2). Thus, by manipulating the amplitude and sign of the values of the boundary samples, the PAR value due to boundary conditions between symbols may be reduced.

The suffixed sequence $y_k^{(m)''}[n]$ is upsampled, in step 540, to produce an interpolated sequence. Upon upsampling 540, a PAR value for each interpolated sequence is calculated, in step 545, and the calculated 545 PAR value is stored, in step 555. Furthermore, upon upsampling 540, a pattern signal $pat^{(m)}[n]$ is appended, in step 550, to the interpolated sequence to produce a patterned sequence. Once a patterned sequence has been produced and a PAR value has been stored 555 for the interpolated sequence, it is determined, in step 560, whether or not a PAR value has been calculated for interpolated sequences generated by all of the possible linear vectors $e^{(m)}$. If the PAR value for all of the possible interpolated sequences has not been calculated, then the process repeats from step 515, wherein another linear vector $e^{(m)}$ is generated. If, on the other hand, PAR values for all possible linear vectors $e^{(m)}$ have been calculated (i.e., $2^Q$ PAR values have been calculated), then the method steps exit to FIG. 6.

In a preferred embodiment, the method steps of FIG. 5C are performed by the processor 405 of FIG. 4. However, it will be clear to one of ordinary skill in the art that the method steps may also be performed by other systems.

Figure 6:
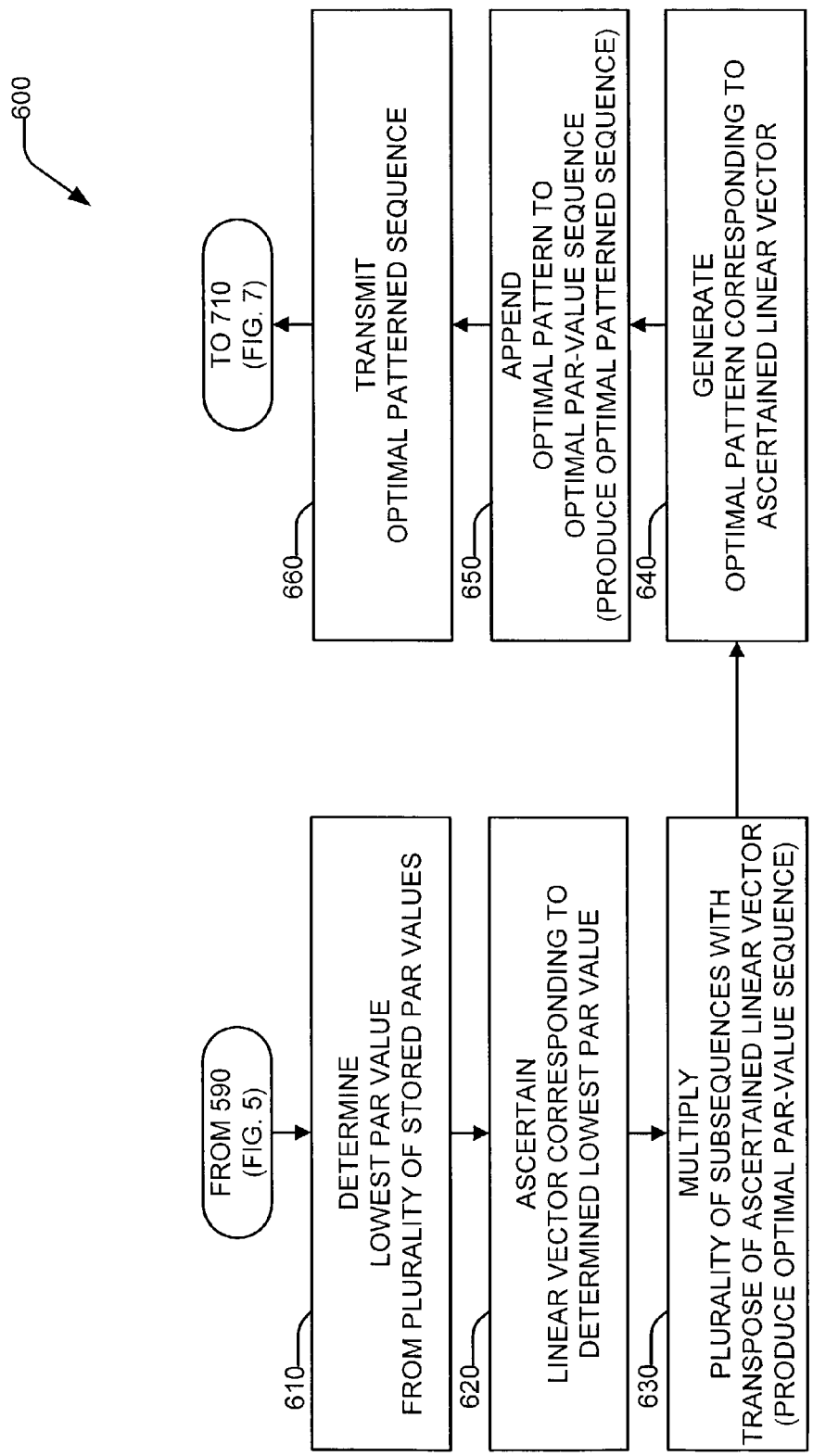

FIGS. 6 and 7 are a flowcharts showing additional steps associated one embodiment of the invention. Specifically, FIG. 6 completes the data transmission process in one embodiment of the invention, while FIG. 7 addresses the data reception process in one embodiment of the invention. As shown in FIG. 6, once all of the PAR values have been calculated and stored 555, the lowest PAR value is determined, in step 610, from the stored 555 PAR values, and the linear vector corresponding to the determined 610 lowest PAR value is ascertained, in step 620. The ascertained 620 linear vector is then transposed and multiplied, in step 630, to the sub-sequences to produce an optimal PAR-value sequence, and an optimal pattern corresponding to the ascertained 620 linear vector is generated, in step 640. The generated 640 optimal pattern is appended, in step 650, to the optimal PAR-value sequence to produce an optimal patterned sequence, and the optimal patterned sequence is then transmitted, in step 660. In a preferred embodiment using ADSL-DMT technology, the pattern signal is mapped onto a single tone, such as bin 33, so that:

$$pat^{(m)}[n] = 2Re\{a_Q e^{(m)} e^{j2\pi\frac{33n}{512}}\},$$

where $a_Q e^{(m)}$ designates the mapped complex value, which is associated with the linear vector $e^{(m)}$, in a Q-bit quadrature amplitude modulation (QAM) scheme, and Re indicates that the information is stored in the real portion of the complex number. If a single tone is insufficient for proper mapping of the pattern signal, then the pattern signal may be mapped onto two tones, such as bin 33 and 34, so that:

$$pat^{(m)}[n] = 2Re\{a_{Q-Re}^{(m)} e^{j2\pi\frac{33n}{512}} + a_R e^{(m)} e^{j2\pi\frac{33n}{512}}\},$$

where $a_{Q-Re}^{(m)}$ and $a_R e^{(m)}$ designate the mapped complex values for the two tones in a QAM scheme.

In a preferred embodiment, the method steps shown in FIG. 6 are performed by an ATU as shown in FIG. 2. However, it will be clear to one of ordinary skill in the art that the method steps may also be performed by other systems.

Once the optimal patterned sequence has been transmitted 660, it is received, in step 710. In a preferred embodiment of an ADSL-DMT system, since the pattern information is stored on one or two dedicated tones (depending on SNR constraints) as:

$$pat^{(m)}[n] = 2Re\{a_Q e^{(m)} e^{j2\pi\frac{33n}{512}}\}$$

or $$pat^{(m)}[n] = 2Re\{a_{Q-Re}^{(m)} e^{j2\pi\frac{33n}{512}} + a_R e^{(m)} e^{j2\pi\frac{33n}{512}}\},$$

the pattern signal is extracted from the dedicated tone (or tones) in the received sequence. This is done in step 720. Upon extracting 720 the pattern signal, the sub-sequences are reconstructed, in step 730, using the extracted 720 pattern signal, thereby producing the desired signal.

The symbol divider 410, IFT logic 415, linear vector generator 422, pattern generator 424, prefix generator 426, suffix generator 428, multiplier 430, append logic 435, resampler 440, PAR calculator 445, comparator 450, and correlator 455 of the present invention can be implemented in hardware, software, firmware, or a combination thereof. In the preferred embodiment(s), the symbol divider 410, IFT logic 415, linear vector generator 422, pattern generator 424, prefix generator 426, suffix generator 428, multiplier 430, append logic 435, resampler 440, PAR calculator 445, comparator 450, and correlator 455 are implemented in hardware using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc. In an alternative embodiment, the symbol divider 410, IFT logic 415, linear vector generator 422, pattern generator 424, prefix generator 426, suffix generator 428, multiplier 430, append logic 435, resampler 440, PAR calculator 445, comparator 450, and correlator 455 are implemented in software or firmware that is stored in a memory and that is executed by a suitable instruction execution system.

Any process descriptions or blocks in flow charts should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

Although an exemplary embodiment of the present invention has been shown and described, it will be apparent to those of ordinary skill in the art that a number of changes, modifications, or alterations to the invention as described may be made, none of which depart from the spirit of the present invention. For example, while the processor of FIG. 4 is shown as including a plurality of components, it will be clear to one of ordinary skill in the art that these components may be separately located in the ATU, apart from the processor. Additionally, while the symbol divider 410 is shown without a connection to the memory 460, it will be clear to one of ordinary skill in the art that the symbol divider may be connected to memory 460, thereby providing read and write access to memory 460 by the symbol divider 410. Furthermore, while other components (e.g., IFT logic 415, linear vector generator 422, pattern generator 424, prefix generator 426, suffix generator 428, multiplier 430, append logic 435, resampler 440, PAR calculator 445, comparator 450, correlator 455, etc.) are shown with a direct connection to memory 460, it will be clear to one of ordinary skill in the art that some of these connections may be severed without adverse effect to the functionality of the invention. All such changes, modifications, and alterations should therefore be seen as within the scope of the present invention.

What is claimed is:

1. In a digital subscriber line (DSL) system employing discrete multi-tone (DMT) technology, wherein a bandwidth is divided into a plurality of discrete symbols, a method for reducing peak-to-average ratio (PAR) values comprising:
   (a) dividing the plurality of discrete symbols into non-overlapping subsets of symbols, wherein an aggregation of the non-overlapping subsets of symbols produces the plurality of discrete symbols;
   (b) generating sub-sequences from the non-overlapping subsets of symbols by performing an inverse Fourier transform (IFT) on each of the non-overlapping subsets of symbols;
   (c) combining the generated sub-sequences using a binary vector to produce a combined sequence, wherein the binary vector has a number of elements equal to the number of sub-sequences, wherein the binary vector is an arrangement of elements, wherein the elements are either +1 or −1;
   (d) appending a pattern signal to the combined sequence to produce a patterned sequence, wherein the pattern signal corresponds to the arrangement of elements in the binary vector;
   (e) adding a cyclic prefix to the patterned sequence to produce a prefixed sequence;
   (f) adding a suffix to the prefixed sequence to produce a suffixed sequence;
   (g) upsampling the suffixed sequence to produce an interpolated sequence;
   (h) calculating a peak-to-average ratio (PAR) value of the interpolated sequence;
   (i) storing the calculated PAR value of the interpolated sequence;
   (j) iteratively repeating steps (c) through (i) to produce a plurality of binary vectors and a plurality of calculated PAR values, wherein each iteration uses a binary vector having a different arrangement of elements, wherein the iteration of steps (c) through (i) terminates when every different arrangement of elements has been used to combine the generated sub-sequences;
   (k) determining the lowest PAR value from the calculated PAR values;
   (l) selecting an optimal binary vector from the plurality of binary vectors, wherein the optimal binary vector is the binary vector corresponding to the lowest PAR value;
   (m) combining the generated sub-sequences using the optimal binary vector to produce an optimal combined sequence;
   (n) adding a cyclic prefix to the optimal combined sequence to produce an optimal prefixed sequence;
   (o) adding a suffix to the optimal prefixed sequence to produce an optimal PAR sequence; and
   (p) transmitting the optimal PAR sequence.

2. A system for reducing peak-to-average ratio (PAR) values comprising:
   a symbol divider configured to divide a plurality of symbols into a number of non-overlapping subsets of symbols, wherein the aggregation of the non-overlapping subsets of symbols produces the plurality of symbols;
   inverse Fourier transform (IFT) logic configured to perform an IFT on each of the non-overlapping subsets of symbols to produce a plurality of sub-sequences;
   linear vector generator configured to generate a linear vector having a number of elements, wherein the number of elements in the generated linear vector is the same as the number of sub-sequences in the plurality of sub-sequences;
   a multiplier configured to multiply the generated linear vector with the plurality of sub-sequences to produce a combined sequence;
   a resampler configured to upsample the combined sequence to produce an interpolated sequence;
   PAR calculator configured to calculate the PAR value of the interpolated sequence;
   a prefix generator configured to generate a cyclic prefix, wherein the cyclic prefix is configured to reduce intersymbol interference, wherein the values of the cyclic prefix are the end values of the combined sequence;
   memory configured to store the calculated PAR value
   a comparator configured to compare a plurality of stored PAR values wherein the comparator is further configured to determine a lowest PAR value from the compared plurality of stored PAR values;
   a correlator configured to correlate the determined lowest PAR value with a linear vector;
   a pattern generator configured to generate a pattern indicative of the linear vector; and
   append logic configured to append the generated pattern to the linear vector.

3. The system of claim 2, wherein the append logic is further configured to append the cyclic prefix to the beginning of the linear vector.

4. The system of claim 2, further comprising a suffix generator configured to generate a suffix, wherein the suffix is configured to reduce effects of intersymbol boundary conditions.

5. The system of claim 4, wherein the append logic is further configured to append the suffix to the end of the linear vector.

6. A method for reducing peak-to-average ratio (PAR) values comprising:

(a) dividing a plurality of symbols into a number of non-overlapping subsets of symbols, wherein an aggregation of the non-overlapping subsets of symbols produces the plurality of symbols;
(b) performing an inverse Fourier transform (IFT) on each of the non-overlapping subsets of symbols to produce a plurality of sub-sequences;
(c) multiplying the plurality of sub-sequences with a linear vector having a number of elements to produce a combined sequence, wherein the number of elements in the linear vector is the same as the number of sub-sequences;
(d) upsampling the combined sequence to produce an interpolated sequence;
(e) calculating the peak-to-average ratio (PAR) value of the interpolated sequence;
(f) appending a pattern signal to interpolated sequence to produce a patterned sequence, wherein the pattern signal is indicative of linear vector;
(g) storing the calculated PAR value; and
(h) iteratively repeating steps (c) through (g) to produce a plurality of stored PAR values, wherein each iteration uses a different linear vector in the step of (c) multiplying the plurality of sub-sequences with a linear vector, wherein each of the plurality of stored PAR values corresponds to a different linear vector.

7. The method of claim 6, further comprising:
(i) determining the lowest PAR value from the plurality of stored PAR values.

8. The method of claim 7, further comprising:
(j) ascertaining the linear vector corresponding to the determined lowest PAR value.

9. The method of claim 7, further comprising:
(k) multiplying the plurality of sub-sequences with the ascertained linear vector to produce an optimal PAR-value sequence.

10. The method of claim 9, further comprising:
(l) adding an optimal pattern signal to the optimal PAR-value sequence to produce an optimal patterned sequence, wherein the optimal pattern signal corresponds to the ascertained linear vector.

11. The method of claim 10, further comprising:
(m) transmitting the optimal patterned sequence.

12. The method of claim 11, further comprising:
(n) receiving the optimal patterned sequence;
(o) extracting the pattern signal from the optimal patterned sequence; and
(p) reconstructing the sub-sequences using the extracted pattern signal.

13. The method of claim 6, wherein the linear vector is a binary vector.

14. The method of claim 13, wherein each element of the binary vector is either +1 or −1.

15. A method for reducing peak-to-average ratio (PAR) values comprising:
(a) dividing a plurality of symbols into a number of non-overlapping subsets of symbols, wherein an aggregation of the non-overlapping subsets of symbols produces the plurality of symbols;
(b) performing an inverse Fourier transform (IFT) on each of the non-overlapping subsets of symbols to produce a plurality of sub-sequences;
(c) multiplying the plurality of sub-sequences with a linear vector having a number of elements to produce a combined sequence, wherein the number of elements in the linear vector is the same as the number of sub-sequences;
(d) adding a cyclic prefix to the combined sequence to produce a prefixed sequence;
(e) upsampling the prefixed sequence to produce an interpolated sequence;
(f) calculating the peak-to-average ratio (PAR) value of the interpolated sequence;
(g) appending a pattern signal to the interpolated sequence to produce a patterned sequence, wherein the pattern signal corresponds to the linear vector;
(h) storing the calculated PAR value; and
(i) iteratively repeating steps (c) through (h) to produce a plurality of stored PAR values, wherein each iteration uses a different linear vector in the step of (c) multiplying the plurality of sub-sequences with a linear vector, wherein each of the plurality of stored PAR values corresponds to a different linear vector.

16. The method of claim 15, further comprising:
(j) determining the lowest PAR value from the plurality of stored PAR values;
(k) ascertaining the linear vector corresponding to the determined lowest PAR value;
(l) multiplying the plurality of sub-sequences with the ascertained linear vector to produce an optimal PAR-value sequence; and
(m) adding an optimal pattern signal to the optimal PAR-value sequence to produce an optimal patterned sequence, wherein the optimal pattern signal corresponds to the ascertained linear vector.

17. The method of claim 15, wherein the cyclic prefix is configured to reduce an intersymbol interference.

18. The method of claim 15, wherein the values of the cyclic prefix are the end values of the combined sequence.

19. A method for reducing peak-to-average ratio (PAR) values comprising:
(a) dividing a plurality of symbols into a number of non-overlapping subsets of symbols, wherein an aggregation of the non-overlapping subsets of symbols produces the plurality of symbols;
(b) performing an inverse Fourier transform (IFT) on each of the non-overlapping subsets of symbols to produce a plurality of sub-sequences;
(c) multiplying the plurality of sub-sequences with a linear vector having a number of elements to produce a combined sequence, wherein the number of elements is the same as the number of sub-sequences;
(d) adding a cyclic prefix to the combined sequence to produce a prefixed sequence;
(e) adding a suffix to the prefixed sequence to produce a suffixed sequence;
(f) upsampling the suffixed sequence to produce an interpolated sequence;
(g) calculating the peak-to-average ratio (PAR) value of the interpolated sequence;
(h) appending a pattern signal to the interpolated sequence to produce a patterned sequence, wherein the pattern signal corresponds to the linear vector;
(i) storing the calculated PAR value; and
(j) iteratively repeating steps (c) through (i) to produce a plurality of stored PAR values wherein each iteration uses a different linear vector in the step of (c) multiplying the plurality of sub-sequences with a linear vector wherein each of the plurality of stored PAR values corresponds to a different linear vector.

20. The method of claim 19, further comprising:
(k) determining the lowest PAR value from the plurality of stored PAR values;

(l) ascertaining the linear vector corresponding to the determined lowest PAR value;

(m) multiplying the plurality of sub-sequences with the ascertained linear vector to produce an optimal PAR-value sequence; and (n) adding an optimal pattern signal to the optimal PAR-value sequence to produce an optimal patterned sequence, wherein the optimal pattern signal corresponds to the ascertained linear vector.

21. The method of claim 19, wherein the suffix is configured to reduce effects of intersymbol boundary conditions.

22. A system for reducing peak-to-average ratio (PAR) values comprising:

(a) means for dividing a plurality of symbols into a number of non-overlapping subsets of symbols, wherein an aggregation of the non-overlapping subsets of symbols produces the plurality of symbols;

(b) means for performing an inverse Fourier transform (IFT) on each of the non-overlapping subsets of symbols to produce a plurality of sub-sequences;

(c) means for multiplying the plurality of sub-sequences with a linear vector having a number of elements to produce a combined sequence, wherein the number of elements in the linear vector is the same as the number of sub-sequences wherein the linear vector is a binary vector wherein each element of the binary vector is either +1 or −1;

(d) means for upsampling the combined sequence to produce an interpolated sequence;

(e) means for calculating the peak-to-average ratio (PAR) value of the interpolated sequence; and (f) means for appending a pattern signal to interpolated sequence to produce a patterned sequence, wherein the pattern signal is indicative of linear vector; and (g) means for storing the calculated PAR value.

23. A system for reducing peak-to-average ratio (PAR) values comprising:

(a) means for dividing a plurality of symbols into a number of non-overlapping subsets of symbols, wherein an aggregation of the non-overlapping subsets of symbols produces the plurality of symbols;

(b) means for performing an inverse Fourier transform (IFT) on each of the non-overlapping subsets of symbols to produce a plurality of sub-sequences;

(c) means for multiplying the plurality of sub-sequences with a linear vector having a number of elements to produce a combined sequence, wherein the number of elements in the linear vector is the same as the number of sub-sequences;

(d) means for adding a cyclic prefix to the combined sequence to produce a prefixed sequence, wherein the values of the cyclic prefix are the end values of the combined sequence;

(e) means for upsampling the prefixed sequence to produce an interpolated sequence;

(f) means for calculating the peak-to-average ratio (PAR) value of the interpolated sequence;

(g) means for appending a pattern signal to the interpolated sequence to produce a patterned sequence, wherein the pattern signal corresponds to the linear vector;

(h) means for storing the calculated PAR value, (i) means for determining a lowest PAR value from a plurality of stored PAR values;

(j) means for ascertaining a linear vector corresponding to the determined lowest PAR value;

(k) means for multiplying the plurality of sub-sequences with the ascertained linear vector to produce an optimal PAR-value sequence; and (l) means for adding an optimal pattern signal to the optimal PAR-value sequence to produce an optimal patterned sequence wherein the optimal pattern signal corresponds to the ascertained linear vector.

24. The system of claim 23, wherein the cyclic prefix is configured to reduce an intersymbol interference.

25. A system for reducing peak-to-average ratio (PAR) values comprising:

(a) means for dividing a plurality of symbols into a number of non-overlapping subsets of symbols, wherein an aggregation of the non-overlapping subsets of symbols produces the plurality of symbols;

(b) means for performing an inverse Fourier transform (IFT) on each of the non-overlapping subsets of symbols to produce a plurality of sub-sequences;

(c) means for multiplying the plurality of sub-sequences with a linear vector having a number of elements to produce a combined sequence, wherein the number of elements is the same as the number of sub-sequences;

(d) means for adding a cyclic prefix to the combined sequence to produce a prefixed sequence;

(e) means for adding a suffix to the prefixed sequence to produce a suffixed sequence;

(f) means for upsampling the suffixed sequence to produce an interpolated sequence;

(g) means for calculating the peak-to-average ratio (PAR) value of the interpolated sequence; and (h) means for appending a pattern signal to the interpolated sequence to produce a patterned sequence, wherein the pattern signal corresponds to the linear vector;

(i) means for storing the calculated PAR value;

(j) means for determining a lowest PAR value from a plurality of stored PAR values;

(k) means for ascertaining a linear vector corresponding to the determined lowest PAR value;

(l) means for multiplying the plurality of sub-sequences with the ascertained linear vector to produce an optimal PAR-value sequence; and (m) means for adding an optimal pattern signal to the optimal PAR-value sequence to produce an optimal patterned sequence wherein the optimal pattern signal corresponds to the ascertained linear vector.

26. The system of claim 25, wherein the suffix is configured to reduce effects of intersymbol boundary conditions.

* * * * *